United States Patent
Zhang et al.

(10) Patent No.: US 9,907,089 B2
(45) Date of Patent: Feb. 27, 2018

(54) METHOD AND APPARATUS FOR RETRIEVING A TRANSMISSION OPPORTUNITY CONTROL IN REVERSE DIRECTION GRANT

(71) Applicant: Huawei Technologies Co., Ltd., Shenzhen (CN)

(72) Inventors: Xingxin Zhang, Chengdu (CN); Xun Yang, Shenzhen (CN); Tianyu Wu, Shenzhen (CN); Menghong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 14/823,746

(22) Filed: Aug. 11, 2015

(65) Prior Publication Data

US 2015/0351124 A1 Dec. 3, 2015

Related U.S. Application Data

(63) Continuation of application No. 13/689,445, filed on Nov. 29, 2012, now Pat. No. 9,185,692, which is a
(Continued)

(30) Foreign Application Priority Data

Sep. 16, 2011 (CN) .......................... 2011 1 0276060

(51) Int. Cl.
*H04W 72/14* (2009.01)
*H04W 72/04* (2009.01)
(Continued)

(52) U.S. Cl.
CPC .......... *H04W 72/14* (2013.01); *H04B 7/0452* (2013.01); *H04L 1/1614* (2013.01);
(Continued)

(58) Field of Classification Search
CPC ............. H04W 72/14; H04W 72/0406; H04W 72/042; H04W 72/0446; H04W 74/0833;
(Continued)

(56) References Cited

U.S. PATENT DOCUMENTS 6,594,246 B1 7/2003 Jorgensen
7,330,542 B2 2/2008 Kauhanen et al.
(Continued)

FOREIGN PATENT DOCUMENTS

CN 1809218 A 7/2006
CN 1829145 A 9/2006
(Continued)

OTHER PUBLICATIONS

"Wireless LANs," IEEE 802.11-11/xxxr0, Institute of Electrical and Electronics Engineers, New York, New York (Sep. 2011).
(Continued)

*Primary Examiner* — Obaidul Huq
(74) *Attorney, Agent, or Firm* — Leydig, Voit & Mayer, Ltd.

(57) ABSTRACT

Embodiments of the present invention disclose a method and an apparatus for retrieving transmission opportunity control in reverse direction grant. The method includes: obtaining, by a reverse direction responder (RD responder), a TXOP control from a reverse direction initiator (RD initiator); enabling, by the RD responder, a multi-user multiple-input multiple-output (MU-MIMO) mode; sending, by the RD responder, a frame to a plurality of stations concurrently in a TXOP period, the plurality of stations comprise the RD initiator; wherein the frame carries information that only requires the RD initiator to send back only a single acknowledgement in the TXOP period to return the TXOP control.

6 Claims, 3 Drawing Sheets

Related U.S. Application Data continuation of application No. PCT/CN2012/072698, filed on Mar. 21, 2012.

(51) Int. Cl.
    | | |
    |---|---|
    | *H04L 1/16* | (2006.01) |
    | *H04B 7/0452* | (2017.01) |
    | *H04W 74/08* | (2009.01) |
    | *H04L 1/00* | (2006.01) |
    | *H04W 84/12* | (2009.01) |

(52) U.S. Cl.
    CPC ......... *H04L 1/1685* (2013.01); *H04W 72/042* (2013.01); *H04W 72/0406* (2013.01); *H04W 72/0446* (2013.01); *H04W 74/0833* (2013.01); *H04L 2001/0092* (2013.01); *H04W 84/12* (2013.01)

(58) Field of Classification Search
    CPC .... H04W 84/12; H04B 7/0452; H04L 1/1614; H04L 1/1685; H04L 2001/0092
    USPC ................................. 370/310, 328, 329, 336
    See application file for complete search history.

(56) References Cited

U.S. PATENT DOCUMENTS

| | | | |
|---|---|---|---|
| 7,522,613 | B2 | 4/2009 | Rotsten et al. |
| 7,546,376 | B2 | 6/2009 | Wildegren et al. |
| 7,961,706 | B2 | 6/2011 | Huang et al. |
| 2002/0184510 | A1 | 12/2002 | Shieh |
| 2003/0091066 | A1 | 5/2003 | Choi et al. |
| 2004/0049596 | A1 | 3/2004 | Schuehler et al. |
| 2005/0026558 | A1 | 2/2005 | Stura |
| 2005/0118946 | A1 | 6/2005 | Colban et al. |
| 2005/0122945 | A1 | 6/2005 | Hurtta |
| 2006/0002333 | A1 | 1/2006 | Skog et al. |
| 2006/0002422 | A1 | 1/2006 | Hurtta |
| 2006/0056307 | A1 | 3/2006 | Hellgren et al. |
| 2006/0221879 | A1 | 10/2006 | Nakajima et al. |
| 2007/0147244 | A1 | 6/2007 | Rasanen |
| 2007/0223450 | A1 | 9/2007 | Holmstrom et al. |
| 2007/0274522 | A1 | 11/2007 | Boman et al. |
| 2008/0052258 | A1 | 2/2008 | Wang et al. |
| 2008/0253368 | A1 | 10/2008 | Rasanen |
| 2008/0307081 | A1 | 12/2008 | Dobbins |
| 2009/0010271 | A1 | 1/2009 | Bachmann et al. |
| 2009/0196225 | A1 | 8/2009 | Avila Gonzalez et al. |
| 2009/0204723 | A1 | 8/2009 | Tonsing et al. |
| 2009/0215454 | A1 | 8/2009 | Przybysz et al. |
| 2009/0252110 | A1 | 10/2009 | Sridhara et al. |
| 2009/0252143 | A1 | 10/2009 | Sridhara et al. |
| 2010/0040047 | A1 | 2/2010 | Castellanos Zamora et al. |
| 2011/0044298 | A1 | 2/2011 | Wentink et al. |
| 2011/0149723 | A1 | 6/2011 | Gong et al. |
| 2011/0286402 | A1 | 11/2011 | Gong |

FOREIGN PATENT DOCUMENTS

| | | |
|---|---|---|
| CN | 1855862 A | 11/2006 |
| CN | 1889499 A | 1/2007 |
| CN | 101110766 A | 1/2008 |
| CN | 101159644 A | 4/2008 |
| CN | 101110766 B | 4/2010 |
| EP | 1419614 A2 | 5/2004 |
| WO | WO 2005109938 A1 | 11/2005 |
| WO | WO 2006050758 A1 | 5/2006 |
| WO | WO 2007149020 A1 | 12/2007 |
| WO | WO 2010088535 A1 | 8/2010 |

OTHER PUBLICATIONS

"ACK Protocol and Backoff Procedure for MU-MIMO," IEEE 802.11-10/1092r0, Institute of Electrical and Electronics Engineers, New York, New York (Sep. 2010).

"3$^{rd}$ Generation Partnership Project; Technical Specification Group Services and System Aspects; Evolution of Policy Control and Charging," 3GPP TR 23.803, V7.0.0, pp. 1-30, 3$^{rd}$ Generation Partnership Project, Valbonne, France (Sep. 2005).

"3$^{rd}$ Generation Partnership Project; Technical Specification Group Services and System Aspects; Overall High Level Functionality and Architecture Impacts of Flow Based Charging," 3GPP TS 23.125, V6.8.0, pp. 1-49, 3$^{rd}$ Generation Partnership Project, Valbonne, France (Mar. 2006).

"3$^{rd}$ Generation Partnership Project; Technical Specification Group Services and System Aspects; Policy and Charging Control Architecture (Release 7)," 3GPP TS 23.203, V7.1.0, pp. 1-70, 3$^{rd}$ Generation Partnership Project, Valbonne, France (Dec. 1, 2006). http://www.3gpp.org/ftp/Specs/archive/23%5Fseries/23.203/>.

"3$^{rd}$ Generation Partnership Project; Technical Specification Group Core Network and Terminals; Policy and Charging Control over Rx Reference Point (Release 7)", 3GPP TS 29.214, V1.1.0, pp. 1-29, 3$^{rd}$ Generation Partnership Project, Valbonne, France (Feb. 1, 2007). http://www.3q pp.orq/ftp/Specs/archive/29%5F series/29 .214/>.

"3$^{rd}$ Generation Partnership Project; Technical Specification Group Core Network and Terminals; Policy and Charing Control over Gx Reference Point (Release 7)," 3GPP TS 29.212, V1.1.0, pp. 1-33, 3$^{rd}$ Generation Partnership Project, Valbonne, France (Feb. 1, 2007). http://www.3gpp.org .ftp/Specs/archive/29%5F series/29 .212/>.

"Telecommunications and Internet Converged Services and Protocols for Advanced Networking (TISPAN); Resource and Admission Control: Diameter Protocol for Session Based Policy Set-Up Information Exchange Between the Application Function (AF) and the Service Policy Decision Function (SPDF); Protocol specification," ETSI Standards ,TISPAN V1.1.1, pp. 1-35 (Mar. 1, 2006).

"3$^{rd}$ Generation Partnership Project; Technical Specification Group Services and System Aspects; End-to-end Quality of Service (QoS) concept and architecture (Release 6)," 3GPP TS 23.207, V6.6.0, pp. 1-56, 3$^{rd}$ Generation Partnership Project, Valbonne, France (Sep. 2005).

"3$^{rd}$ Generation Partnership Project; Technical Specification Group Services and System Aspects; IP Multimedia Subsystem (IMS); Stage 2 (Release 7)," 3GPP TS 23.228, V7.6.0, pp. 1-215, 3$^{rd}$ Generation Partnership Project, Valbonne, France (Dec. 2006).

"3$^{rd}$ Generation Partnership Project; Technical Specification Group Core Network and Terminals; Policy control over Go interface (Release 6)," 3GPP TS 29.207, V6.5.0, pp. 1-30, 3$^{rd}$ Generation Partnership Project, Valbonne, France (Sep. 2005).

"ETSI TS 129.207—Digital cellular telecommunications system (Phase 2+); Universal Mobile Telecommunications System (UMTS); Policy control over Go interface (3GPP 29.207 version 6.5.0 Release 6)," ETSI TS 129 207, V6.5.0, pp. 1-56, 3$^{rd}$ Generation Partnership Project, Valbonne, France (Sep. 2005).

"3$^{rd}$ Generation Partnership Project; Technical Specification Group Core Network and Terminals; Policy control over Go interface (Release 6)," 3GPP TS 29.207, V6.5.0, 3$^{rd}$ Generation Partnership Project, Valbonne, France (Sep. 2005).

"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 8: Medium Access Control (MAC) Quality of Service Enhancements," IEEE 802.11e-2005, pp. i-189, Institute of Electrical and Electronics Engineers, New York, New York (Nov. 11, 2005).

"Draft Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 5: Enhancements for Very High Throughput for Operation in Bands below 6 GHz," IEEE P802.11ac/D.1.0, pp. i-242, Institute of Electrical and Electronics Engineers, New York, New York (May 2011).

(56) References Cited

OTHER PUBLICATIONS

"Wireless LANs; D1.0 Comment Resolution on CID 3747," IEEE P802.11, Institute of Electrical and Electronics Engineers, New York, New York (Nov. 4, 2011).
$1^{st}$ Office Action in corresponding child U.S. Appl. No. 13/712,322 (dated Mar. 11, 2013).
Information Disclosure Statement in corresponding U.S. Appl. No. 12/634,147 (Dec. 9, 2009).
Information Disclosure Statement in corresponding U.S. Appl. No. 12/634,147 (Apr. 5, 2010).
Non-Final Rejection in corresponding U.S. Appl. No. 12/634,147 (dated Aug. 4, 2010).
Final Rejection in corresponding U.S. Appl. No. 12/634,147 (dated Oct. 20, 2010).
$2^{nd}$ Office Action in corresponding U.S. Appl. No. 13/712,322 (dated May 29, 2013).
U.S. Appl. No. 12/634,147.
Notice of Allowance in corresponding U.S. Appl. No. 12/052,487 (dated Sep. 5, 2012).
$2^{nd}$ Notice of Allowance in corresponding U.S. Appl. No. 12/052,487 (dated Oct. 24, 2012).
$1^{st}$ Office Action in corresponding U.S. Appl. No. 12/052,487 (dated Oct. 6, 2010).
$2^{nd}$ Office Action in corresponding U.S. Appl. No. 12/052,487 (dated Mar. 23, 2011).
$3^{rd}$ Office Action in corresponding U.S. Appl. No. 12/052,487 (dated Mar. 14, 2012).
$2^{nd}$ Office Action in corresponding U.S. Appl. No. 13/689,445 (dated Jun. 26, 2014).

METHOD AND APPARATUS FOR RETRIEVING A TRANSMISSION OPPORTUNITY CONTROL IN REVERSE DIRECTION GRANT

CROSS-REFERENCE TO RELATED APPLICATIONS

This application is a continuation of U.S. patent application Ser. No. 13/689,445, filed on Nov. 29, 2012, which is a continuation of International Patent Application No. PCT/CN2012/072698, filed on Mar. 21, 2012. The International Patent Application claims priority to Chinese Patent Application No. 201110276060.2, filed on Sep. 16, 2011. The afore-mentioned patent applications are hereby incorporated by reference in their entireties.

FIELD OF THE INVENTION

The present invention relates to the field of communications technologies, and in particular, to a method and an apparatus for retrieving transmission opportunity control in reverse direction grant.

BACKGROUND OF THE INVENTION

A basic service set (BSS) is a basic element of a wireless local area network (WLAN). A BSS network is formed by stations (STA) that have certain association within a specific coverage area. One scenario of the association is that stations directly communicate with each other in an ad hoc network, which is called an independent BSS (IBSS). Another common scenario is that in a BBS network, only one central station for dedicatedly managing a BSS is called an access point (AP), whereas other stations that are not an AP are called terminals, or called non-AP STAs. The AP and non-AP STAs are collectively called STAs. The AP and non-AP STAs do not need to be distinguished in description of the STA. In the same BSS network, due to factors such as a distance and transmit power, one STA is incapable of detecting another STA that is far away from it. The two STAs are hidden nodes for each other.

In the 802.11e protocol, a transmission opportunity (TXOP) is introduced. A TXOP is a bounded time interval during which a station may transmit a frame in a specific communication category. The station obtains a TXOP through contention. Once obtaining the TXOP, the station may transmit a frame in a specific communication category within the TXOP. The frame may specifically be a data frame, a control frame, or a management frame.

When a certain STA obtains a TXOP through contention, the STA is called a TXOP holder. A technology that within the TXOP, when the TXOP holder does not transmit data itself, the TXOP holder temporarily transfers TXOP control to another STA, and the another STA that is enabled to send data to the TXOP holder is called reverse direction grant (RDG). In the RDG, the TXOP holder is called a reverse direction initiator (RD Initiator), and the STA that temporarily obtains the TXOP control granted by the RD Initiator is called a reverse direction responder (RD Responder).

To fully use a spectrum resource and improving a transmission rate, a TXOP sharing mode of multi-user multiple input multiple-output (MU-MIMO) is defined for downlink data of an AP. In this TXOP sharing mode of the MU-MIMO, multiple service types may share one TXOP, so as to implement concurrent transmission of frames of multiple service types in an MU-MIMO mode, thereby greatly saving the spectrum resource.

In traditional RDG, when an RD Responder sends a last frame to an RD Initiator, or requires an RD Initiator to send a block acknowledgement for the frame, the RD Responder automatically returns TXOP control back to the RD Initiator. If the RD Initiator correctly demodulates the last frame sent by the RD Responder, the RD Initiator immediately retrieves the TXOP control. When the RD Responder sends a block acknowledgement request (BAR), the RD Initiator returns a block acknowledgement (BA) to the RD Responder. When the RD Initiator fails to correctly demodulate a block acknowledgement frame, the RD Initiator retrieves the TXOP control by using a point coordination function inter-frame space (PIFS). Retrieving the TXOP control by using the PIFS means that when the RD Initiator fails to correctly demodulate a frame, and does not know whether the frame is a last frame and whether a block acknowledgement is needed for the frame, within one PIFS, the RD Initiator intercepts a state of a channel (busy or idle). If the channel is in an idle state within the PIFS, the RD Initiator retrieves the TXOP control.

Based on the traditional RDG, when the RD Responder is an AP that supports the MU-MIMO, the AP may use an MU-MIMO technology to improve the transmission rate. For example, in a specific scenario, existing stations are an AP, an STA1, and an STA2. The STA1 and the STA2 are hidden nodes for each other, the RD Initiator is the STA1, and the RD Responder is the AP. When the AP enables the MU-MIMO, concurrently sends a frame to the STA1 and the STA2, and requires the STA2 to send an acknowledgement in time, if the STA1 fails to correctly demodulate the frame, the STA1 retrieves TXOP control by using a PIFS and then continues sending another frame to the AP. However, in this case, the STA2 sends a BA to the AP according to a requirement of the AP. That is, at the same time point, the STA1 sends another frame to the AP and the STA2 sends a BA to the AP, thereby resulting in a conflict.

SUMMARY OF THE INVENTION

Embodiments of the present invention provide a method and an apparatus for retrieving transmission opportunity control in reverse direction grant, so that a conflict occurring between a case where an RD Initiator continues sending another frame to an RD Responder after retrieving TXOP control and a case where a terminal other than the RD Initiator sends a block acknowledgement to the RD Responder can be avoided.

In one aspect, an embodiment of the present invention provides a method for retrieving transmission opportunity control in reverse direction grant, where the method includes:

when a reverse direction initiator RD Initiator fails to correctly demodulate a frame sent by a reverse direction responder RD Responder, retrieving, by the RD Initiator, transmission opportunity TXOP control by using a point coordination function inter-frame space PIFS if it is impossible for the RD Responder to enable a multi-user multiple-input multiple-output MU-MIMO mode, and retrieving, by the RD Initiator, the TXOP control by using a duration if it is possible for the RD Responder to enable the MU-MIMO mode, where the duration is longer than the PIFS.

In another aspect, an embodiment of the present invention provides a method for retrieving transmission opportunity control in reverse direction grant, where the method includes:

when a reverse direction initiator RD Initiator fails to correctly demodulate very high throughput signaling A1 in a frame sent by a reverse direction responder RD responder, retrieving, by the RD Initiator, transmission opportunity TXOP control by using a point coordination function inter-frame space PIFS if it is impossible for the RD Responder to enable a multi-user multiple-input multiple-output MU-MIMO mode, and retrieving, by the RD Initiator, the TXOP control by using a duration if it is possible for the RD Responder to enable the MU-MIMO mode, where the duration is longer than the PIFS;

when the RD Initiator correctly demodulates the very high throughput signaling A1 in the frame sent by the RD responder but fails to correctly demodulate the frame completely, retrieving, by the RD Initiator, the TXOP control by using the PIFS if the frame is a single-user frame and a value of a partial association identifier Partial AID in the very high throughput signaling A1 is the same as a value of a Partial AID of the RD Initiator;

when the RD Initiator correctly demodulates the very high throughput signaling A1 in the frame sent by the RD responder but fails to correctly demodulate the frame completely, retrieving, by the RD Initiator, the TXOP control by using a duration if the frame is a multi-user frame, where the duration is longer than the PIFS; and when the RD Initiator correctly demodulates the very high throughput signaling A1 in the frame sent by the RD responder but fails to correctly demodulate the frame completely, retrieving, by the RD Initiator, the TXOP control by using a duration if the frame is a single-user frame and the value of the partial association identifier Partial AID in the very high throughput signaling A1 is different from the value of the Partial AID of the RD Initiator, where the duration is longer than the PIFS.

In another aspect, an embodiment of the present invention provides a method for retrieving transmission opportunity control in reverse direction grant, where the method includes:

when a reverse direction responder RD responder enables a multi-user multiple-input multiple-output MU-MIMO mode, and the RD responder concurrently sends a frame to a plurality of stations that include a reverse direction initiator RD Initiator, requiring only the RD Initiator to send a block acknowledgement, so that the RD Initiator is capable of retrieving transmission opportunity TXOP control.

In one aspect, an embodiment of the present invention provides a reverse direction initiator RD Initiator, including:

a first control retrieving unit, configured to, when a reverse direction initiator RD Initiator fails to correctly demodulate a frame sent by a reverse direction responder RD Responder, retrieve transmission opportunity TXOP control by using a point coordination function inter-frame space PIFS if it is impossible for the RD Responder to enable a multi-user multiple-input multiple-output MU-MIMO mode; and a second control retrieving unit, configured to, when the RD Initiator fails to correctly demodulate the frame sent by the RD Responder, retrieve the TXOP control by using a duration if it is possible for the RD Responder to enable the MU-MIMO mode, where the duration is longer than the PIFS;

In another aspect, an embodiment of the present invention provides a reverse direction initiator RD Initiator, including:

a first control retrieving unit, configured to, when a reverse direction initiator RD Initiator fails to correctly demodulate a very high throughput signaling A1 in a frame sent by a reverse direction responder RD responder, retrieve transmission opportunity TXOP control by using a point coordination function inter-frame space PIFS if it is impossible for the RD Responder to enable a multi-user multiple-input multiple-output MU-MIMO mode; and a second control retrieving unit, configured to, when the RD Initiator fails to correctly demodulate the very high throughput signaling A1 in the frame sent by the RD responder, retrieve the TXOP control by using a duration if it is possible for the RD Responder to enable the MU-MIMO mode, where the duration is longer than the PIFS;

a third control retrieving unit, configured to, when the RD Initiator correctly demodulates the very high throughput signaling A1 in the frame sent by the RD responder but fails to correctly demodulate the frame completely, retrieve the TXOP control by using the PIFS if the frame is a single-user frame and a value of a partial association identifier Partial AID in the very high throughput signaling A1 is the same as a value of a Partial AID of the RD Initiator;

a fourth control retrieving unit, configured to, when the RD Initiator correctly demodulates the very high throughput signaling A1 in the frame sent by the RD responder but fails to correctly demodulate the frame completely, retrieve the TXOP control by using a duration if the frame is a multi-user frame, where the duration is longer than the PIFS; and a fifth control retrieving unit, configured to, when the RD Initiator correctly demodulates the very high throughput signaling A1 in the frame sent by the RD responder but fails to correctly demodulate the frame completely, retrieve the TXOP control by using a duration if the frame is a single-user frame and the value of the partial association identifier Partial AID in the very high throughput signaling A1 is different from the value of the Partial AID of the RD Initiator, where the duration is longer than the PIFS.

In one aspect, an embodiment of the present invention provides a reverse direction responder RD Responder, where:

when the RD Responder is configured to, when the RD responder enables a multi-user multiple-input multiple-output MU-MIMO mode, and the RD responder concurrently sends a frame to a plurality of stations that include a reverse direction initiator RD Initiator, require only the RD Initiator to send a block acknowledgement, so that the RD Initiator is capable of retrieving transmission opportunity TXOP control.

It can be seen from the foregoing technical solutions that, the embodiments of the present invention have the following advantages.

In an embodiment of the present invention, when an RD Initiator fails to correctly demodulate a frame sent by an RD Responder, the RD Initiator retrieves TXOP control by using a duration if it is possible for the RD Responder to enable an MU-MIMO mode, where the duration is longer than a PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder. If it is impossible for the RD Responder to enable the MU-MIMO mode, it is impossible for the RD Responder to concurrently send a frame to the RD Initiator and the terminal other than the RD Initiator. Therefore, a conflict occurring between a case where the RD Initiator continues sending another frame to the RD Responder after retrieving the TXOP control and a case where the terminal other than the RD Initiator sends a block acknowledgement to the RD Responder does not occur.

In another embodiment of the present invention, when an RD Initiator fails to correctly demodulate a very high throughput signaling in a frame sent by an RD responder, the RD Initiator retrieves TXOP control by using a duration if it is possible for the RD Responder to enable an MU-MIMO mode, where the duration is longer than a PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

When the RD Initiator correctly demodulates the very high throughput signaling A1 in the frame sent by the RD responder but fails to correctly demodulate the frame completely, the RD Initiator retrieves the TXOP control by using the PIFS if the frame is a single-user frame and a value of a Partial AID in the frame is the same as a value of a Partial AID of the RD Initiator. Because the frame sent by the RD Responder to the RD Initiator is a single-user frame, that is, the frame is sent only by the RD Responder to the RD Initiator, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

When the RD Initiator satisfies one of the following conditions, the RD Initiator retrieves the TXOP control by using a duration that is longer than the PIFS. The following conditions are: The frame is a multi-user frame; and the value of the Partial AID in the very high throughput signaling A1 is different from the value of the Partial AID of the RD Initiator. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

In another embodiment of the present invention, when an RD responder enables an MU-MIMO mode, and the RD responder concurrently sends a frame to a plurality of stations that include an RD Initiator, only the RD Initiator is required to send a block acknowledgement, so that the RD Initiator is capable of retrieving TXOP control. Because the RD Responder requires only the RD Initiator to send a block acknowledgement and may not require an STA other than the RD Initiator to send a block acknowledgement, a conflict occurring between a case where the RD Initiator continues sending another frame to the RD Responder after retrieving the TXOP control and a case where the terminal other than the RD Initiator sends a block acknowledgement to the RD Responder does not occur.

BRIEF DESCRIPTION OF THE DRAWINGS

To illustrate the technical solutions in the embodiments of the present invention more clearly, the accompanying drawings required for describing the embodiments are briefly described in the following. Apparently, the accompanying drawings in the following description merely show some embodiments of the present invention, and persons of ordinary skill in the art may still derive other drawings from these accompanying drawings.

DETAILED DESCRIPTION OF THE EMBODIMENTS

Figure 1:
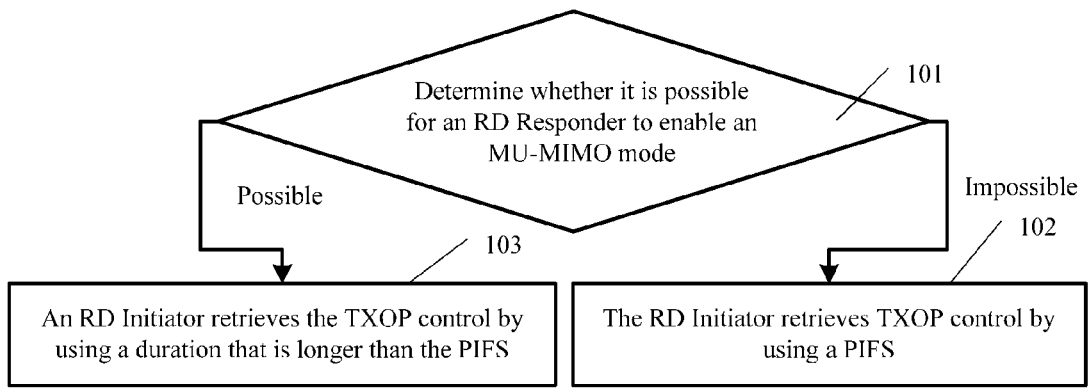
FIG. 1 is a flow chart of a method for retrieving transmission opportunity control in reverse direction grant according to an embodiment of the present invention.

Embodiments of the present invention provide a method and an apparatus for retrieving transmission opportunity control in reverse direction grant, so that a conflict occurring between a case where an RD Initiator continues sending another frame to an RD Responder after retrieving TXOP control and a case where a terminal other than the RD Initiator sends a block acknowledgement to the RD Responder can be avoided.

To make the objectives, features, and advantages of the present invention clearer and more comprehensible, the technical solutions in the embodiments of the present invention are described clearly and completely in the following with reference to the accompanying drawings in the embodiments of the present invention. Apparently, the embodiments to be described are only a part rather than all of the embodiments of the present invention. Based on the embodiments of the present invention, all other embodiments derived by persons skilled in the art shall fall within the protection scope of the present invention.

An embodiment of the present invention provides a method for retrieving TXOP control in RDG, where the method includes:

when an RD Initiator fails to correctly demodulate a frame sent by an RD Responder, retrieving, by the RD Initiator, TXOP control by using a PIFS if it is impossible for the RD Responder to enable an MU-MIMO mode, and retrieving, by the RD Initiator, the TXOP control by using a duration if it is possible for the RD Responder to enable the MU-MIMO mode, where the duration is longer than the PIFS.

In this embodiment of the present invention, when the RD Initiator fails to correctly demodulate the frame sent by the RD Responder, the RD Initiator retrieves the TXOP control by using a duration if it is possible for the RD Responder to enable the MU-MIMO mode, where the duration is longer than the PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder. If it is impossible for the RD Responder to enable the MU-MIMO mode, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

For details of the method for retrieving TXOP control in RDG provided in this embodiment of the present invention, reference is made to FIG. 1. The method for retrieving TXOP control in RDG provided in this embodiment of the present invention includes:

101. When an RD Initiator fails to correctly demodulate a frame sent by an RD Responder, the RD Initiator determines whether it is possible for the RD Responder to enable an MU-MIMO mode. If it is impossible for the RD Responder to enable the MU-MIMO mode, 102 is triggered for execution; and if it is possible for the RD Responder to enable the MU-MIMO mode, 103 is triggered for execution.

In this embodiment of the present invention, in a scenario where the RD Initiator fails to correctly demodulate the frame sent by the RD Responder, the RD Initiator determines whether it is possible for the RD Responder to enable the MU-MIMO mode. It should be noted that there are multiple implementation manners for the RD Initiator to determine whether it is possible for the RD Responder to enable the MU-MIMO mode. The following describes the multiple implementation modes in detail.

A2. The RD Initiator determines whether the RD Initiator supports the MU-MIMO mode. If the RD Initiator does not support the MU-MIMO mode, it is impossible for the RD Responder to enable the MU-MIMO mode.

A frame is transmitted between the RD Initiator and the RD Responder. If the RD Responder does not support the MU-MIMO mode, it is impossible for the RD Responder to enable the MU-MIMO mode.

A2. The RD Initiator determines whether the RD Initiator belongs to any group that is used for enabling the MU-MIMO mode. If the RD Initiator does not belong to any group that is used for enabling the MU-MIMO mode, it is impossible for the RD Responder to enable the MU-MIMO mode.

A frame is transmitted between the RD Initiator and the RD Responder. If the RD Initiator does not belong to any group (Group) that is used for enabling the MU-MIMO mode, it is impossible for the RD Responder to enable the MU-MIMO mode.

A3. The RD Initiator determines whether the RD Responder supports the MU-MIMO mode. If the RD Responder does not support the MU-MIMO mode, it is impossible for the RD Responder to enable the MU-MIMO mode.

Before a frame is transmitted between the RD Initiator and the RD Responder, the RD Initiator is capable of acquiring whether the RD Responder supports the MU-MIMO mode. If the RD Responder does not support the MU-MIMO mode, it is impossible for the RD Responder to enable the MU-MIMO mode.

It should be noted that, for the foregoing three implementation manners A2, A2, and A3, if at least one of three determination results is "no", the RD Initiator may determine that it is impossible for the RD Responder to enable the MU-MIMO mode, and 102 is triggered for execution. The foregoing A1, A2, and A3 are all optional determination methods and any one of them may be selected. Alternatively, persons skilled in the art may use other determination methods. The determination methods herein are for illustration only rather than limitation.

On the contrary, when the RD Initiator belongs to at least one group that is used for enabling the MU-MIMO mode, the RD Initiator may consider that it is possible for the RD Responder to enable the MU-MIMO mode, and 103 is triggered for execution. Definitely, other implementation manners may also be used for determining that it is possible for the RD Responder to enable the MU-MIMO mode. The implementation manners herein are for illustration only rather than limitation.

102. If it is impossible for the RD Responder to enable the MU-MIMO mode, the RD Initiator retrieves TXOP control by using a PIFS.

In this embodiment of the present invention, if it is impossible for the RD Responder to enable the MU-MIMO mode, the RD Responder is capable of sending a frame to only the RD Initiator, but is incapable of sending a frame to an STA other than the RD Initiator, and may also not require the STA other than the RD Initiator to send a block acknowledgement. In this case, the RD Initiator retrieves the TXOP control by using the PIFS, and then continues sending another frame to the RD Responder. Therefore, a conflict between a case where the RD Initiator continues sending another frame to the RD Responder after retrieving the TXOP control and a case where the terminal other than the RD Initiator sends a block acknowledgement to the RD Responder does not occur.

In this embodiment of the present invention, retrieving the TXOP control by using the PIFS means that when the RD Initiator fails to correctly demodulate a frame, and does not know whether the frame is a last frame and whether a block acknowledgement is needed for the frame, within one PIFS, the RD Initiator intercepts a state of a channel (busy or idle). If the channel is in an idle state within the PIFS, the RD Initiator retrieves the TXOP control. One PIFS is one short inter-frame space plus one time slot.

In a BSS network, only one central station for dedicatedly managing the BSS is called an access point (AP, Access Point), whereas other stations that are not an AP are called terminals, or called non-AP STAs. The AP and non-AP STAs are collectively called STAs. The AP and non-AP STAs do not need to be distinguished in description of the STA.

For an independent BSS network, a direct data transmission object of an STA is another STA. For a BSS network that has an AP, a direct data transmission object of a non-AP STA is another non-AP STA or AP. However, in one BSS network, a direct data transmission object of an AP may be a plurality of non-AP STAs. Therefore, when an AP obtains TXOP control, within one control period of TXOP control, a direct data transmission object of the AP may be a plurality of non-AP STAs. When the AP serves as an RD Responder but it is impossible for the RD Responder to enable an MU-MIMO mode, the RD Initiator retrieves the TXOP control by using a PIFS, and therefore, a conflict between a case where the RD Initiator continues sending another frame to the RD Responder after retrieving the TXOP control and a case where the terminal other than the RD Initiator sends a block acknowledgement to the RD Responder does not occur.

103. If it is possible for the RD Responder to enable the MU-MIMO mode, the RD Initiator retrieves the TXOP control by using a duration that is longer than the PIFS.

In this embodiment of the present invention, it can be known through the determination in 101 that when it is possible for the RD Responder to enable the MU-MIMO mode, the RD Initiator retrieves the TXOP control by using a duration that is longer than the PIFS.

In this embodiment of the present invention, retrieving the TXOP control by using a duration that is longer than the PIFS means that when the RD Initiator fails to correctly demodulate a frame, and does not know whether the frame is a last frame and whether a block acknowledgement is needed for the frame, within one duration that is longer than the PIFS, the RD Initiator intercepts a state of a channel (busy or idle). If the channel is in an idle state within the duration that is longer than the PIFS, the RD Initiator retrieves the TXOP control.

It should be noted that in this embodiment of the present invention, in a practical application, the duration that is longer than the PIFS may be implemented in multiple implementation manners. The following describes the multiple implementation manners in detail.

One implementation manner is that the duration that is longer than the PIFS may be expressed as the following expression (1):

Duration that is longer than the $PIFS=2*SIFS+$aSlot-Time+Max(BA Time), where the SIFS is a short inter-frame space, the aSlotTime is an interval, and the Max(BA Time) is a maximum duration for sending a block acknowledgement frame. The maximum duration for sending a block acknowledgement frame is a duration required for modulating the block acknowledgement frame at a minimum bit rate and separately sending the block acknowledgement frame by using a minimum unit frequency band.

It can be obtained from the expression (1) that within the duration that is longer than the PIFS and is described in the expression (1), if a terminal other than the RD Initiator sends a block acknowledgement to the RD Responder, the RD Initiator is capable of intercepting on a channel that the channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

Another implementation manner is that a block acknowledgement frame sent by an STA other than the RD Initiator is a compressed block acknowledgement frame (Compressed BA), the duration that is longer than the PIFS may be expressed as the following expression (2):

Duration that is longer than the $PIFS=2*SIFS+$aSlot-Time+Max(Compressed BA Time), where the SIFS is a short inter-frame space, the aSlotTime is an interval, and the Max(Compressed BA Time) is a maximum duration for sending a compressed block acknowledgement frame. The maximum duration for sending a compressed block acknowledgement frame is a duration for modulating the block acknowledgement frame at a minimum bit rate and separately sending the block acknowledgement frame by using a minimum unit frequency band.

It can be obtained from the expression (2) that within the duration that is longer than the PIFS and is described in the expression (2), if a terminal other than the RD Initiator sends a block acknowledgement to the RD Responder, the RD Initiator is capable of intercepting on a channel that the channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

In this embodiment of the present invention, when the RD Initiator fails to correctly demodulate the frame sent by the RD Responder, the RD Initiator retrieves the TXOP control by using a duration if it is possible for the RD Responder to enable the MU-MIMO mode, where the duration is longer than the PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder. If it is impossible for the RD Responder to enable the MU-MIMO mode, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

Figure 2:
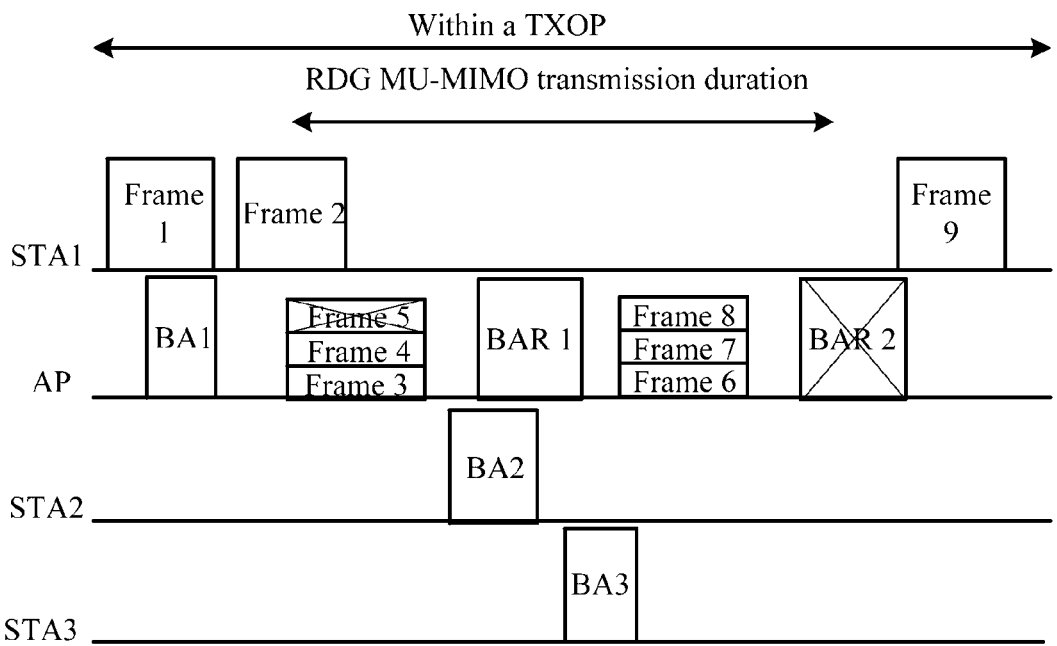
FIG. 2 is a schematic diagram of frame interaction between an RD Initiator and an RD Responder according to an embodiment of the present invention.

A method for retrieving transmission opportunity control in reverse direction grant provided in an embodiment of the present invention is described in the following by using a detailed application scenario. As shown in FIG. 2, in a BSS network, an AP, an STA1, an STA2, and an STA3 exist. The STA1 first obtains TXOP control through contention, and the STA1 becomes a TXOP holder. The STA1 sends a frame 1 and a frame 2 to the AP. When the TXOP holder does not transmit data itself, the TXOP holder temporarily transfers the TXOP control to the AP to enable the AP to send data to the TXOP holder. That is, the STA1 is an RD Initiator, and the AP is an RD Responder.

As shown in FIG. 2, within one TXOP, after sending the frame 1 to the AP, the STA1 requires the AP to send an acknowledgement. The AP sends a BA1 to the STA1, and then the STA1 sends the frame 2 to the AP and temporarily transfers the TXOP control to the AP. Within an RDG MU-MIMO transmission duration, the AP sends a frame 5 to the STA1. Because the AP enables an MU-MIMO mode, the AP concurrently sends the frame 5 to the STA2 and a frame 3 to the STA3, and requires the STA2 to send an acknowledgement. Therefore, the STA2 sends a BA2 to the AP. In this case, demodulation of the STA1 on the frame 5 fails, that is, the STA1 fails to correctly demodulate the frame 5. According to the method provided in this embodiment of the present invention, when the STA1 that servers as the RD Initiator fails to correctly demodulate a frame sent by the RD Responder, the RD Initiator determines whether it is possible for the RD Responder (that is, the AP) to enable the MU-MIMO mode. If it is possible for the RD Responder to enable the MU-MIMO mode, the RD Initiator retrieves the TXOP control by using a duration that is longer than a PIFS. In an embodiment illustrated in FIG. 2, when the RD Initiator intercepts a busy/idle state of a channel within the duration that is longer than the PIFS, and finds that the channel is in the busy state (the channel is in the busy state because the STA2 sends the BA2 to the AP). Therefore, the STA1 does not retrieve the TXOP control.

After receiving the BA2 sent by the STA2, the AP sends a BAR1 to the STA3, to require the STA3 to send an acknowledgement. Therefore, the STA3 sends a BA3 to the STA1 according to a requirement of the AP. Then, the AP continues sending a frame 8 to the STA1, and concurrently sends a frame 7 to the STA2 and a frame 6 to the STA3. After sending the three frames, the AP completes frame sending. In this case, the AP sends a BRA2 to the STA1, to require the STA1 to send an acknowledgement. However, when the STA1 fails to correctly demodulate the BAR2, according to the method provided in this embodiment of the present invention, the RD Initiator retrieves the TXOP control by using the PIFS if it is impossible for the RD Responder to enable the MU-MIMO mode. That is, if the STA1 intercepts within the PIFS that the channel is always in the idle state, the STA1 may retrieve the TXOP control. According to the method provided in this embodiment of the present invention, if it is possible for the RD Responder to enable the MU-MIMO mode, the RD Initiator retrieves the TXOP control by using a duration that is longer than the PIFS. That is, if the STA1 intercepts within the duration that is longer than the PIFS that the channel is always in the idle state, the STA1 may retrieve the TXOP control and then continues sending a frame 9 to the AP.

Another method for retrieving TXOP control in RDG provided in an embodiment of the present invention is described in the following, and includes:

when an RD Initiator fails to correctly demodulate a very high throughput signaling A1 in a frame sent by an RD responder, retrieving, by the RD Initiator, TXOP control by using a PIFS if it is impossible for the RD Responder to enable an MU-MIMO mode, and retrieving, by the RD Initiator, the TXOP control by using a duration if it is possible for the RD Responder to enable the MU-MOMO mode, where the duration is longer than the PIFS;

when the RD Initiator correctly demodulates the very high throughput signaling A1 in the frame sent by the RD responder but fails to correctly demodulate the frame completely, retrieving, by the RD Initiator, the TXOP control by using the PIFS if the frame is a single-user frame and a value of a Partial AID in the very high throughput signaling A1 is the same as a value of a Partial AID of the RD Initiator;

when the RD Initiator correctly demodulates the very high throughput signaling A1 in the frame sent by the RD responder but fails to correctly demodulate the frame completely, retrieving, by the RD Initiator, the TXOP control by using a duration if the frame is a multi-user frame, where the duration is longer than the PIFS; and when the RD Initiator correctly demodulates the very high throughput signaling A1 in the frame sent by the RD responder but fails to correctly demodulate the frame completely, retrieving, by the RD Initiator, the TXOP control by using a duration if the frame is a single-user frame and the value of the Partial AID in the very high throughput signaling A1 is different from the value of the Partial AID of the RD Initiator, where the duration is longer than the PIFS.

In another embodiment of the present invention, when an RD Initiator fails to correctly demodulate a very high throughput signaling A1 in a frame sent by an RD responder, the RD Initiator retrieves TXOP control by using a duration if it is possible for the RD Responder to enable an MU-MIMO mode, where the duration is longer than a PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

When the RD Initiator correctly demodulates the very high throughput signaling A1 in the frame sent by the RD responder but fails to correctly demodulate the frame completely, the RD Initiator retrieves the TXOP control by using the PIFS if the frame is a single-user frame and a value of a Partial AID in the frame is the same as a value of a Partial AID of the RD Initiator. Because the frame sent by the RD Responder to the RD Initiator is a single-user frame, that is, the frame is sent only by the RD Responder to the RD Initiator, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

When the RD Initiator satisfies one of the following conditions, the RD Initiator retrieves the TXOP control by using a duration that is longer than the PIFS. Preset conditions are: The frame is a multi-user frame; and the value of the Partial AID in the very high throughput signaling A1 is different from the value of the Partial AID of the RD Initiator. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

Figure 3:
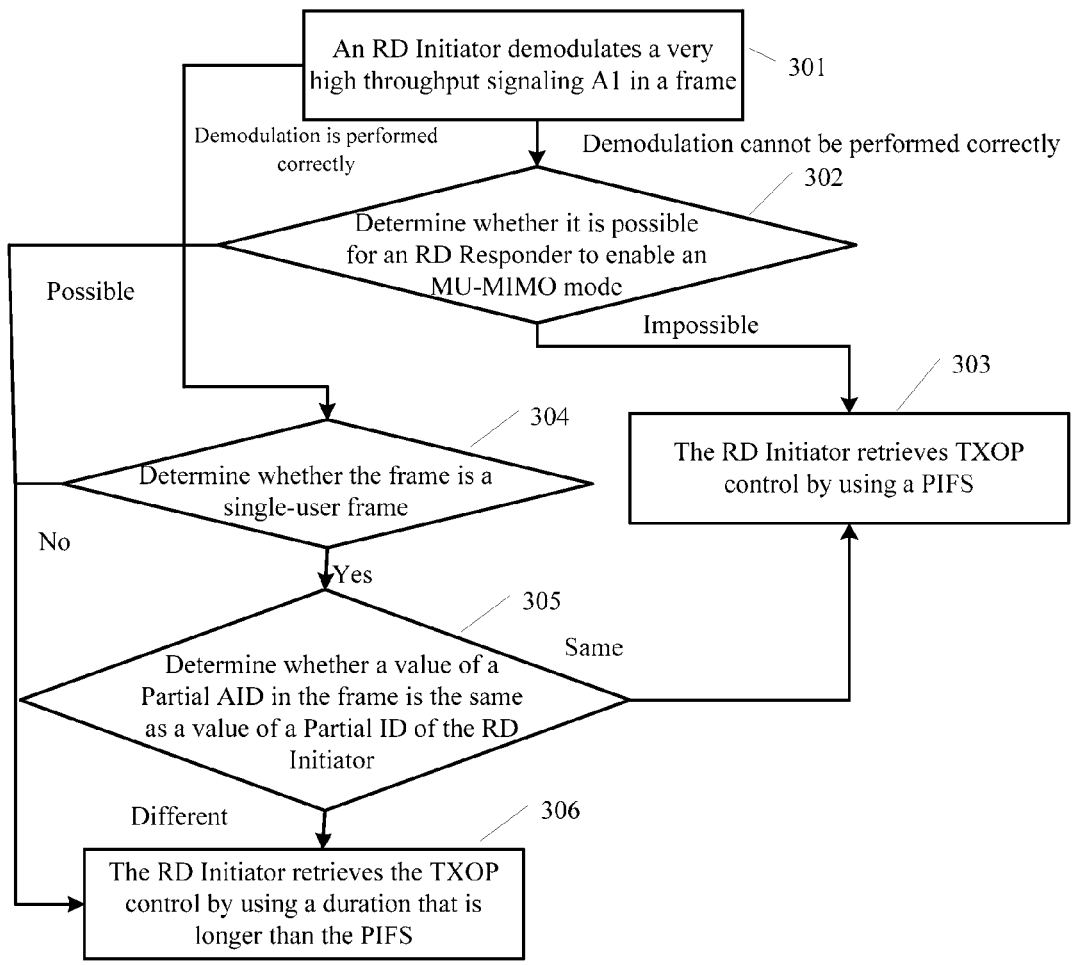
FIG. 3 is a flow chart of a method for retrieving transmission opportunity control in reverse direction grant according to another embodiment of the present invention.

For details of the method for retrieving TXOP control in RDG provided in this embodiment of the present invention, reference is made to FIG. 3, where the method includes:

301. An RD Initiator demodulates a very high throughput signaling A1 in a frame sent by an RD Responder. If the RD Initiator fails to correctly demodulate the very high throughput signaling A1, 302 is triggered for execution; and if the RD Initiator correctly demodulates the very high throughput signaling A1 but fails to correctly demodulate the frame completely, 304 is triggered for execution.

In this embodiment of the present invention, the RD Initiator demodulates the very high throughput signaling A1 in the frame, where the very high throughput signaling A1 (Very high Throughput Signal field-A1, VH-SIG-A1) carries a group identifier (Group Identifier, Group ID) and a partial association identifier (Partial association identifier, Partial AID).

302. When the RD Initiator fails to correctly demodulate the very high throughput signaling A1 in the frame sent by the RD Responder, the RD Initiator determines whether it is possible for the RD Responder to enable an MU-MIMO mode. If it is impossible for the RD Responder to enable the MU-MIMO mode, 303 is triggered for execution; and if it is possible for the RD Responder to enable the MU-MIMO mode, 306 is triggered for execution.

In this embodiment of the present invention, in a scenario where the RD Initiator fails to correctly demodulate the very high throughput signaling A1 in the frame sent by the RD Responder, the RD Initiator determines whether it is possible for the RD Responder to enable the MU-MIMO mode. It should be noted that there are multiple implementation manners for the RD Initiator to determine whether it is possible for the RD Responder to enable the MU-MIMO mode. The following describes the multiple implementation manners in detail.

B1. The RD Initiator determines whether the RD Initiator supports the MU-MIMO mode. If the RD Initiator does not support the MU-MIMO mode, it is impossible for the RD Responder to enable the MU-MIMO mode.

A frame is transmitted between the RD Initiator and the RD Responder. If the RD Initiator does not support the MU-MIMO mode, it is impossible for the RD Responder to enable the MU-MIMO mode.

B2. The RD Initiator determines whether the RD Initiator belongs to any group that is used for enabling the MU-MIMO mode. If the RD Initiator does not belong to any group that is used for enabling the MU-MIMO mode, it is impossible for the RD Responder to enable the MU-MIMO mode.

A frame is transmitted between the RD Initiator and the RD Responder. If the RD Initiator does not belong to any group (Group) that is used for enabling the MU-MIMO mode, it is impossible for the RD Responder to enable the MU-MIMO mode.

B3. The RD Initiator determines whether the RD Responder supports the MU-MIMO mode. If the RD Responder does not support the MU-MIMO mode, it is impossible for the RD Responder to enable the MU-MIMO mode.

Before a frame is transmitted between the RD Initiator and the RD Responder, the RD Initiator is capable of acquiring whether the RD Responder supports the MU-MIMO mode. If the RD Responder does not support the MU-MIMO mode, it is impossible for the RD Responder to enable the MU-MIMO mode.

It should be noted that, for the foregoing three implementation manners B1, B2, and B3, if at least one of three determination results is "no", the RD Initiator may determine that it is impossible for the RD Responder to enable the MU-MIMO mode, and 302 is triggered for execution. The foregoing B1, B2, and B3 are all optional determination methods and any one of them may be selected. Alternatively, persons skilled in the art may use other determination methods. The determination methods herein are for illustration only rather than limitation.

On the contrary, when the RD Initiator belongs to at least one group that is used for enabling the MU-MIMO mode, the RD Initiator may consider that it is possible for the RD Responder to enable the MU-MIMO mode, and 303 is triggered for execution. Definitely, other implementation manners may also be used for determining that it is possible for the RD Responder to enable the MU-MIMO mode. The implementation manners herein are for illustration only rather than limitation.

303. The RD Initiator retrieves TXOP control by using a PIFS.

In this embodiment of the present invention, if it is impossible for the RD Responder to enable the MU-MIMO mode, the RD Responder is capable of sending a frame to only the RD Initiator, but is incapable of sending a frame to an STA other than the RD Initiator, and may also not require the STA other than the RD Initiator to send a block acknowledgement. In this case, the RD Initiator retrieves the TXOP control by using the PIFS, and then continues sending another frame to the RD Responder. Therefore, a conflict between a case where the RD Initiator continues sending another frame to the RD Responder after retrieving the TXOP control and a case where the terminal other than the RD Initiator sends a block acknowledgement to the RD Responder does not occur.

304. If the RD Initiator correctly demodulates the very high throughput signaling A1 and the RD Initiator determines, according to the group identifier in the very high throughput signaling A1, whether the frame is a single-user frame. If the frame is a single-user frame, 305 is triggered for execution; and if the frame is not a single-user frame, 306 is triggered for execution.

In a very high throughput signaling A1 (VHT-SIG-A1, Very High Throughput-Signal-A1) at a physical layer, a group identifier (Group ID) field is used to indicate MU-MIMO, and a partial association identifier (Partial AID) field is used to indicate an ID of a target STA of the data. When a value of the Group ID field is a value ranging from 2 to 62, it indicates that the data packet is a multi-user (Multiple-User) data packet; and when the value of the Group ID field is 0 or 63, it indicates that the data packet is a single-user (SU, Single User) data packet. If a value of the Partial AID field in the data packet matches with that of a Partial AID of an STA, it indicates that the SU data packet is a data packet of the STA.

In this embodiment of the present invention, the RD Initiator determines, according to the group identifier in the very high throughput signaling A1, whether the frame is a single-user frame, which may specifically be: determining whether a value of a Group ID is 0 or 63. If the value of the Group ID is 0 or 63, the frame is a single-user frame. If the value of the Group ID is neither 0 nor 63, the frame is not a single-user frame but is a multi-user frame.

305. If the frame is a single-user frame, the RD Initiator determines whether a value of a Partial AID in the frame is the same as a value of a Partial AID of the RD Initiator. If the value of the Partial AID in the frame is the same as the value of the Partial AID of the RD Initiator, 302 is triggered for execution. If the value of the Partial AID in the frame is different from the value of the Partial AID of the RD Initiator, 306 is triggered for execution.

306. The RD Initiator retrieves the TXOP control by using a duration that is longer than the PIFS.

It should be noted that 306 in the embodiment illustrated in FIG. 3 is similar to 103 shown in FIG. 1, which is not detailed here again.

It should be noted that in this embodiment of the present invention, in a practical application, the duration that is longer than the PIFS may be implemented in multiple implementation manners. The following describes the multiple implementation manners in detail.

One implementation manner is that, within the duration that is longer than the PIFS and is described in the expression (1), if a terminal other than the RD Initiator sends a block acknowledgement to the RD Responder, the RD Initiator is capable of intercepting on a channel that the channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

Another implementation manner is that, within the duration that is longer than the PIFS and is described in the expression (2), if a terminal other than the RD Initiator sends a block acknowledgement to the RD Responder, the RD Initiator is capable of intercepting on a channel that the channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

In this embodiment of the present invention, when the RD Initiator fails to correctly demodulate the very high throughput signaling in the frame sent by the RD responder, the RD Initiator retrieves the TXOP control by using a duration if it is possible for the RD Responder to enable the MU-MIMO mode, where the duration is longer than the PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

When the RD Initiator correctly demodulates the very high throughput signaling A1 in the frame sent by the RD responder but fails to correctly demodulate the frame completely, the RD Initiator retrieves the TXOP control by using the PIFS if the frame is a single-user frame and the value of the Partial AID in the frame is the same as the value of the Partial AID of the RD Initiator. Because the frame sent by the RD Responder to the RD Initiator is a single-user frame, that is, the frame is sent only by the RD Responder to the RD Initiator, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

When the RD Initiator satisfies one of the following conditions, the RD Initiator retrieves the TXOP control by using a duration that is longer than the PIFS. The following conditions are: The frame is not a single-user frame; and the value of the Partial AID in the very high throughput signaling A1 is different from the value of the Partial AID of the RD Initiator. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

Another method for retrieving transmission opportunity control in reverse direction grant provided in an embodiment of the present invention is described in the following, and includes:

when an RD responder enables an MU-MIMO mode, and the RD responder concurrently sends a frame to a plurality of stations that include an RD Initiator, requiring only the RD Initiator to send a block acknowledgement, so that the RD Initiator is capable of retrieving TXOP control.

In a practical application, the method may further include: when the RD Initiator fails to correctly demodulate the frame sent by the RD Responder, retrieving, by the RD Initiator, the TXOP control by using a PIFS.

In this embodiment of the present invention, when the RD responder enables the MU-MIMO mode, and concurrently sends a frame to a plurality of stations that include the RD Initiator, only the RD Initiator is required to send a block acknowledgement, so that the RD Initiator is capable of retrieving the TXOP control. The RD Responder requires only the RD Initiator to send a block acknowledgement. Because the RD Responder may not require an STA other than the RD Initiator to send a block acknowledgement. Therefore, a conflict between a case where the RD Initiator continues sending another frame to the RD Responder after retrieving the TXOP control and a case where the terminal other than the RD Initiator sends a block acknowledgement to the RD Responder does not occur.

In the foregoing embodiments, the method for retrieving transmission opportunity control in reverse direction grant provided in the embodiments of the present invention is described. A reverse direction initiator RD Initiator provided in an embodiment of the present invention is described in the following.

Figure 4:
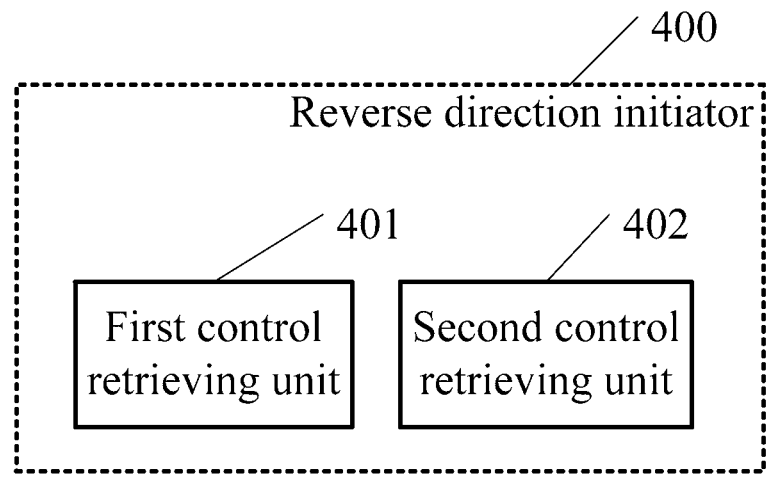
FIG. 4 is a schematic diagram of a reverse direction initiator according to an embodiment of the present invention.

As shown in FIG. 4, an embodiment of the present invention provides a reverse direction initiator RD Initiator 400, including:

a first control retrieving unit 401, configured to, when an RD Initiator fails to correctly demodulate a frame sent by an RD Responder, retrieve TXOP control by using a PIFS if it is impossible for the RD Responder to enable an MU-MIMO mode;

a second control retrieving unit 402, configured to, when the RD Initiator fails to correctly demodulate the frame sent by the RD Responder, retrieve the TXOP control by using a duration if it is possible for the RD Responder to enable the MU-MIMO mode, where the duration is longer than the PIFS.

For the first control retrieving unit 401, in a practical application, an implementable manner is that the first control retrieving unit 401 is specifically configured to:

retrieve the TXOP control by using the PIFS when the RD Initiator fails to correctly demodulate the frame sent by the RD Responder and the RD Initiator does not support the MU-MIMO mode;

or retrieve the TXOP control by using the PIFS when the RD Initiator fails to correctly demodulate the frame sent by the RD Responder and the RD Initiator does not belong to any group that is used for enabling the MU-MIMO mode;

or retrieve the TXOP control by using the PIFS when the RD Initiator fails to correctly demodulate the frame sent by the RD Responder and the RD Responder does not support the MU-MIMO mode.

For the second control retrieving unit 402, in a practical application, an implementable manner is that the second control retrieving unit 402 is specifically configured to:

retrieve the TXOP control by using a duration when the RD Initiator fails to correctly demodulate the frame sent by the RD Responder and the RD Initiator belongs to at least one group that is used for enabling the MU-MIMO mode, where the duration is longer than the PIFS.

It should be noted that content such as information exchange and an execution process between modules/units of the apparatus is based on the same concept as the method embodiments of the present invention. The technical effects are the same as those of the method embodiments of the present invention. For details, reference may be made to the description of the method embodiment illustrated in FIG. 1 in the present invention, which are not detailed here again.

In this embodiment of the present invention, if it is possible for the RD Responder to enable the MU-MIMO mode, the second control retrieving unit 402 retrieves the TXOP control by using a duration that is longer than the PIFS. Because the RD Initiator retrieves the TXOP control by using a duration that is longer than the PIFS, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder. If it is impossible for the RD Responder to enable the MU-MIMO mode, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

Figure 5:
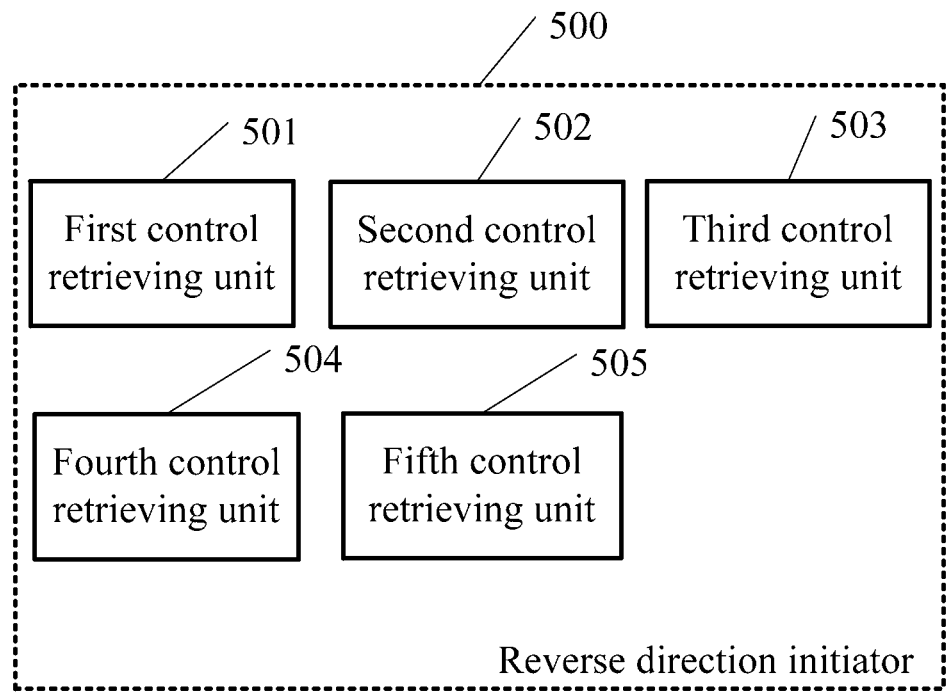
FIG. 5 is a schematic diagram of a reverse direction initiator according to another embodiment of the present invention.

As shown in FIG. 5, an embodiment of the present invention provides another reverse direction initiator 500, including:

a first control retrieving unit 501, configured to, when an RD Initiator fails to correctly demodulate a very high throughput signaling A1 in a frame sent by an RD Responder, retrieve TXOP control by using a PIFS if it is impossible for the RD Responder to enable an MU-MIMO mode;

a second control retrieving unit 502, configured to, when the RD Initiator fails to correctly demodulate the very high throughput signaling A1 in the frame sent by the RD Responder, retrieve the TXOP control by using a duration if it is possible for the RD Responder to enable the MU-MIMO mode, where the duration is longer than the PIFS;

a third control retrieving unit 503, configured to, when the RD Initiator correctly demodulates the very high throughput signaling A1 in the frame sent by the RD responder but fails to correctly demodulate the frame completely, retrieve the TXOP control by using the PIFS if the frame is a single-user frame and a value of a Partial AID in the very high throughput signaling A1 is the same as a value of a Partial AID of the RD Initiator;

a fourth control retrieving unit 504, configured to, when the RD Initiator correctly demodulates the very high throughput signaling A1 in the frame sent by the RD responder but fails to correctly demodulate the frame completely, retrieve the TXOP control by using a duration if the frame is a multi-user frame, where the duration is longer than the PIFS; and a fifth control retrieving unit 505, configured to, when the RD Initiator correctly demodulates the very high throughput signaling A1 in the frame sent by the RD responder but fails to correctly demodulate the frame completely, retrieve the TXOP control by using a duration if the frame is a single-user frame and the value of the Partial AID in the very high throughput signaling A1 is different from the value of the Partial AID of the RD Initiator, where the duration is longer than the PIFS.

For the first control retrieving unit 501, in a practical application, an implementable manner is that the first control retrieving unit 501 is specifically configured to:

retrieve the TXOP control by using the PIFS when the RD Initiator fails to correctly demodulate the frame sent by the RD Responder and the RD Initiator does not support the MU-MIMO mode;

or retrieve the TXOP control by using the PIFS when the RD Initiator fails to correctly demodulate the frame sent by the RD Responder and the RD Initiator does not belong to any group that is used for enabling the MU-MIMO mode;

or retrieve the TXOP control by using the PIFS when the RD Initiator fails to correctly demodulate the frame sent by the RD Responder and the RD Responder does not support the MU-MIMO mode.

For the second control retrieving unit 502, in a practical application, an implementable manner is that the second control retrieving unit 502 is specifically configured to:

retrieve the TXOP control by using a duration when the RD Initiator fails to correctly demodulate the frame sent by the RD Responder and the RD Initiator belongs to at least one group that is used for enabling the MU-MIMO mode, where the duration is longer than the PIFS.

It should be noted that content such as information exchange and an execution process between modules/units of the apparatus is based on the same concept as the method embodiments of the present invention. The technical effects are the same as those of the method embodiments of the present invention. For details, reference may be made to the description of the method embodiment illustrated in FIG. 3 in the present invention, which are not detailed here again.

In this embodiment of the present invention, when the RD Initiator fails to correctly demodulate the very high throughput signaling A1 in the frame sent by the RD responder, the RD Initiator retrieves the TXOP control by using a duration if it is possible for the RD Responder to enable the MU-MIMO mode, where the duration is longer than the PIFS. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

When the RD Initiator correctly demodulates the very high throughput signaling A1 in the frame sent by the RD responder but fails to correctly demodulate the frame completely, the RD Initiator retrieves the TXOP control by using the PIFS if the frame is a single-user frame and the value of the Partial AID in the frame is the same as the value of the Partial AID of the RD Initiator. Because the frame sent by the RD Responder to the RD Initiator is a single-user frame, that is, the frame is sent only by the RD Responder to the RD Initiator, it is impossible for the RD Responder to concurrently send a frame to the RD Initiator and the terminal other than the RD Initiator. Therefore, a conflict between a case where the RD Initiator continues sending another frame to the RD Responder after retrieving the TXOP control and a case where the terminal other than the RD Initiator sends a block acknowledgement to the RD Responder does not occur.

When the RD Initiator satisfies one of the following conditions, the RD Initiator retrieves the TXOP control by using a duration that is longer than the PIFS. The following conditions are: The frame is a multi-user frame; and the value of the Partial AID in the very high throughput signaling A1 is different from the value of the Partial AID of the RD Initiator. Because the RD Initiator retrieves the TXOP control by using a duration that is longer than the PIFS, that is, within the duration that is longer than the PIFS, a terminal other than the RD Initiator sends a block acknowledgment to the RD Responder, and then the RD Responder continues sending a frame. In this case, the RD Initiator may intercept that a channel is in a busy state, and does not retrieve the TXOP control, thereby avoiding a conflict occurring between a case where the RD Initiator continues sending another frame to the RD Responder after retrieving the TXOP control and a case where the terminal other than the RD Initiator sends a block acknowledgement to the RD Responder.

A reverse direction responder RD Responder provided in an embodiment of the present invention is described in the following. An RD Responder is configured to, when the RD responder enables an MU-MIMO mode, and concurrently sends a frame to a plurality of stations that include an RD Initiator, require only the RD Initiator to send a block acknowledgement, so that the RD Initiator is capable of retrieving TXOP control.

In this case, when the RD Initiator fails to correctly demodulate a frame sent by the RD Responder, the RD Initiator retrieves the TXOP control by using a PIFS.

In this embodiment of the present invention, when the RD responder enables the MU-MIMO mode, and concurrently sends a frame to a plurality of stations that include the RD Initiator, only the RD Initiator is required to send a block acknowledgement, so that the RD Initiator is capable of retrieving the TXOP control. Because the RD Responder requires only the RD Initiator to send a block acknowledgement and may not require an STA other than the RD Initiator to send a block acknowledgement. Therefore, a conflict between a case where the RD Initiator continues sending another frame to the RD Responder after retrieving the TXOP control and a case where the terminal other than the RD Initiator sends a block acknowledgement to the RD Responder does not occur.

Persons of ordinary skill in the art may understand that all or a part of the steps of the methods in the embodiments may be implemented by a program instructing relevant hardware. The program may be stored in a computer readable storage medium. The storage medium may be a read-only memory, a magnetic disk, or an optical disk, and the like.

The method and the apparatus for retrieving transmission opportunity control in reverse direction grant provided in the present invention are described in detail in the foregoing. Persons of ordinary skill in the art may make variations to the specific implementation manner and application scope according to the ideas of the embodiments of the present invention. In conclusion, the content of this specification shall not be construed as a limitation to the present invention.

What is claimed is:

1. A method for retrieving a transmission opportunity (TXOP) control in reverse direction grant, the method comprising:
   obtaining, by a reverse direction responder (RD responder), the TXOP control from a reverse direction initiator (RD initiator);
   enabling, by the RD responder, a multi-user multiple-input multiple-output (MU-MIMO) mode;
   sending, by the RD responder, a frame to a plurality of stations concurrently in a TXOP period, wherein the plurality of stations comprise the RD initiator, wherein the sent frame carries information requiring only the RD initiator send back to the RD responder a block acknowledgement in the TXOP period to return the TXOP control to the RD responder; and
   receiving, by the RD responder, only the block acknowledgement from the RD initiator in the TXOP period, thereby avoiding a conflict between a first situation where the RD responder continues receiving frames from the RD initiator after the RD responder retrieves the TXOP control and a second situation where the RD responder receives a block acknowledgment from a station other than the RD initiator.

2. The method for retrieving a TXOP control in reverse direction grant according to claim 1, wherein:
   when the RD initiator fails to correctly demodulate the frame, the TXOP control is retrieved by the RD initiator using a point coordination function inter-frame space (PITS).

3. A reverse direction responder (RD responder) comprising:
   an obtaining unit configured to obtain a transmission opportunity (TXOP) control from a reverse direction initiator (RD initiator);
   a processing unit configured to enable a multi-user multiple-input multiple-output (MU-MIMO) mode;
   a sending unit configured to send a frame to a plurality of stations concurrently in a TXOP period, wherein the plurality of stations comprise the RD initiator, wherein the sent frame carries information requiring only the RD initiator send back to the RD responder a block acknowledgement in the TXOP period to return the TXOP control to the RD responder; and a receiving unit configured to receive only the block acknowledgement from the RD initiator in the TXOP period, thereby avoiding a conflict between a first situation where the RD responder continues receiving frames from the RD initiator after the RD responder retrieves the TXOP control and a second situation where the RD responder receives a block acknowledgment from a station other than the RD initiator.

4. The RD responder according to claim 3, wherein:

when the RD initiator fails to correctly demodulate the frame, the TXOP control is retrieved by the RD initiator using a point coordination function inter-frame space (PIFS).

5. A reverse direction responder (RD responder) comprising a processor and a non-transitory computer readable medium containing instructions which when executed causes the processor to implement the following:

obtaining a transmission opportunity (TXOP) control from a reverse direction initiator (RD initiator) included in a plurality of stations;

enabling a multi-user multiple-input multiple-output (MU-MIMO) mode;

concurrently sending a frame to the plurality of stations in a TXOP period, wherein the sent frame carries information requiring that only the RD initiator send back to the RD responder a block acknowledgement in the TXOP period to return the TXOP control to the RD responder; and receiving only the block acknowledgement from the RD initiator in the TXOP period, thereby avoiding a conflict between a first situation where the RD responder continues receiving frames from the RD initiator after the RD responder retrieves the TXOP control and a second situation where the RD responder receives a block acknowledgment from a station other than the RD initiator.

6. The RD responder according to claim 4, wherein:

when the RD initiator fails to correctly demodulate the frame, the TXOP control is retrieved by the RD initiator using a point coordination function inter-frame space (PITS).

* * * * *